(12) United States Patent  
de Lamberterie (10) Patent No.: US 8,845,142 B2  
(45) Date of Patent: Sep. 30, 2014

(54) OPTICAL SYSTEM FOR GENERATING A COMPOSITE LIGHT BEAM WITH WIDE ANGULAR OPENING

(75) Inventor: Antoine de Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 64 days.

(21) Appl. No.: 13/437,181

(22) Filed: Apr. 2, 2012

(65) Prior Publication Data

US 2012/0250331 A1 Oct. 4, 2012

(30) Foreign Application Priority Data

Mar. 31, 2011 (FR) ...................... 11 52682

(51) Int. Cl.
| | | |
|---|---|---|
| F21V 3/00 | (2006.01) | |
| G02B 19/00 | (2006.01) | |
| F21S 8/10 | (2006.01) | |

(52) U.S. Cl.
CPC ......... *F21S 48/1154* (2013.01); *G02B 19/0061* (2013.01); *G02B 19/0028* (2013.01); *F21S 48/1291* (2013.01); *F21S 48/2212* (2013.01); *G02B 19/0047* (2013.01); *F21S 48/215* (2013.01)
USPC ................................. 362/311.01; 362/311.02

(58) Field of Classification Search
USPC ........................ 362/311.01–311.02
See application file for complete search history.

(56) References Cited

U.S. PATENT DOCUMENTS

| | | | |
|---|---|---|---|
| 2,224,178 A | 12/1940 | Bitner | |
| 7,441,929 B2 | 10/2008 | Stefanov et al. | |
| 8,246,216 B2 * | 8/2012 | Jiang et al. | 362/308 |
| 2006/0050530 A1 | 3/2006 | Stefanov et al. | |
| 2010/0061106 A1 * | 3/2010 | Shyu et al. | 362/311.02 |
| 2010/0226127 A1 | 9/2010 | Bigliatti et al. | |

FOREIGN PATENT DOCUMENTS

| | | |
|---|---|---|
| DE | 102009021182 | 11/2010 |
| EP | 2230446 | 9/2010 |
| FR | 2919913 | 2/2009 |
| WO | 2010/091097 | 8/2010 |

* cited by examiner

*Primary Examiner* — Anne Hines  
(74) *Attorney, Agent, or Firm* — Jacox, Meckstroth & Jenkins (57) ABSTRACT

An optical system for generating, from a light source and along an optical axis (X-X), a composite light beam comprising at least one central light beam and at least one peripheral light beam surrounding the central light beam. The system directs towards an optical diffuser for redistributing the composite light beam in a predetermined manner in a plane orthogonal to the optical axis (X-X). The optical system is configured for generating, in a second plane comprising the optical axis (X-X), the central light beam and/or the peripheral light beam in such a manner that light rays of the central light beam and/or of the peripheral light beam are respectively inclined, on either side of the optical axis (X-X), with respect to the optical axis (X-X).

20 Claims, 5 Drawing Sheets

OPTICAL SYSTEM FOR GENERATING A COMPOSITE LIGHT BEAM WITH WIDE ANGULAR OPENING

CROSS-REFERENCE TO RELATED APPLICATIONS

This application claims priority to French Application No. 1152682 filed Mar. 31, 2011, which application is incorporated herein by reference and made a part hereof.

BACKGROUND OF THE INVENTION

1. Field of the Invention

The present invention relates to an optical system for generating a light beam, together with an optical module comprising such an optical system.

2. Description of the Related Art

Although not exclusively, the optical system and the optical module according to the invention are designed to equip motor vehicles, the light beam generated then fulfilling a lighting function (for example low beam, high beam, fog beam) or a signalling function (for example position lights, direction indicator lights, brake indicator lights, reversing lights, rear fog lights, daytime lights).

An optical system is already known from the document FR 2 919 913 for generating, from a single light source and along an optical axis, a composite light beam composed of a plurality of light beams amongst which are a central light beam and a peripheral light beam surrounding the central light beam. This reference is incorporated herein by reference and made a part hereof. For this purpose, a collimator is disposed in the neighborhood of a single light source, for example, a light-emitting diode (LED) capable of emitting light in a Lambertian fashion into a half-space, this source being situated on the optical axis of the optical system.

This collimator is generally fabricated from a single monolithic piece, with symmetry of revolution about the optical axis, and whose external profiles have particular shapes capable of generating the central beam and the peripheral beam. More precisely, on a first side where the light source is disposed, the external profile of the collimator has a central portion and a peripheral portion mutually joined together via a cylindrical intermediate portion and, on a second side opposing the first side, a plane downstream portion perpendicular to the optical axis. The central portion has a convex shape, with a focal point situated at the source. The peripheral portion has a parabolic shape, whose focal point is also situated at the light source.

Thus, the central light beam is generated by refraction of the light rays emitted by the light source on the central portion of the external profile of the collimator, the light rays of the central light beam then being parallel to one another and also parallel to the optical axis. With regard to the peripheral light beam, this is generated by refraction of the light rays emitted by the light source on the intermediate portion, then by total internal reflection of these same light rays on the peripheral portion of the collimator, the light rays of the peripheral light beam being parallel to those of the central light beam and the peripheral light beam surrounding the central light beam.

The composite light beam thus generated, which comprises the central and peripheral light beams, is designed to be directed towards an optical diffuser equipped with a plurality of microstructures arranged to produce an illumination which, in a plane orthogonal to the optical axis of the collimator, exhibits certain features linked to the regulations in force for the road lights and/or signaling lights for motor vehicles that it is designed to form, notably relating to the uniformity and the angular opening of the beam. This optical diffuser can either take the form of a screen (equipped with microstructures) placed as close as possible to the collimator, or, preferably, take the form of microstructures fabricated directly as part of the collimator. In the case of a monobloc system, it will be noted that the microstructures can only be placed on the exit face of the diffuser.

The collimator described in the aforementioned document FR 2 919 913 is particularly advantageous in the respect that it is formed as a single monolithic piece, which can be fabricated in a simple manner using a mould with a complementary shape to that of this piece, and that it allows all of the light intensity emitted, into a half-space, by the light source to be effectively redirected.

However, the angular opening of the composite light beam generated by a collimator of the monobloc type is limited by the total internal reflection limiting angle of the microstructures that form the optical diffuser, within which the light rays coming from the collimator must be refracted. In particular, for a composite light beam with rays parallel to one another and parallel to the optical axis, this limiting angle leads to a maximum angular opening of around 35°. However, although the regulations applicable to the majority of the lights for motor vehicles require angular openings less (for example 20°) than this limiting angle, a wider angular opening is on the contrary required for certain of these lights. For a reversing light, for example, the horizontal angular opening must be of the order of 45° (with a light intensity at 45° close to 15 to 20% with respect to the total light intensity) and the vertical angular opening must be around 5°.

It is furthermore known, from the document EP 2 230 446, that in order to overcome this limitation, it is possible to use an additional screen as optical diffuser on which the microstructures are placed on the entry face of the diffuser element. This configuration allows a lighting and/or signaling beam to be obtained, after passing through the optical diffuser, having an angular opening wider than the opening limit resulting from the total internal reflection limiting angle for microlenses with a concave surface, the resulting horizontal angular opening of the light beam thus being able to reach for example angles equal to 45° or 50°.

However, this solution involves the addition of at least one intermediate optical element, which therefore makes the optical module more complex to manufacture. In this case, it is necessary to align these elements. Such an optical module is furthermore more costly and bulky, and, moreover, leads to additional losses of light due to the Fresnel coefficients (of around 15 to 20%).

SUMMARY OF THE INVENTION

The aim of the present invention is therefore to allow the angular opening of the composite light beam to be widened at the exit of the aforementioned optical module with a view to permitting the fabrication of lighting and/or signaling lights with wide angular opening (for example a reversing light), while at the same time providing a compact optical module of simple design, in particular by placing the emphasis on the fabrication of a single monolithic piece comprising the optical system and the optical diffuser.

With this aim, according to the invention, the optical system designed to generate, from a light source and along an optical axis, a composite light beam:
  comprising at least one central light beam and at least one peripheral light beam surrounding the central light beam; and designed to be directed towards an optical diffuser in order to distribute the composite light beam in a predetermined manner in a first plane orthogonal to the optical axis;

is noteworthy in that it is configured for generating, in a second plane comprising the optical axis, the central light beam and/or the peripheral light beam in such a manner that light rays of the central light beam and/or of the peripheral light beam are respectively inclined, on either side of the optical axis, with respect to the optical axis.

Thus, thanks to the invention, the composite light beam can, at least in part, be pre-oriented by a non-zero angle with respect to the optical axis, which then allows the angular opening corresponding to the total internal reflection limiting angle on the optical diffuser to be exceeded, in order to reach the desired angular opening in a plane of propagation of the beam (comprising the optical axis), without requiring the addition of an intermediate optical system, that the prior art techniques described hereinabove (for which the optical system is a collimator that generates a light beam formed of rays parallel to the optical axis) do not allow.

Furthermore, the composite light beam, coming from the juxtaposition of the central and peripheral light beams, does not reproduce the inclination of the central and/or peripheral light beam because it has been modified by passing through the optical diffuser designed to substantially attenuate the contrasts in the distribution of light, in a plane orthogonal to the optical axis, within the composite light beam.

Furthermore, it is of little consequence that the composite light beam is not uniform after having been redistributed in the first plane by the optical diffuser, because, for applications such as the implementation of a reversing light for a motor vehicle, for which the intensity level is high (for example of the order of 100 candelas) for the user observing it, the presence of regions with lower or zero illumination will not be a handicap. Furthermore, it can be noted that the dimensions of the regions of low luminance are small enough so as not to be visible to an observer.

Thanks to this pre-orientation of at least a part of the composite light beam prior to its passage through the optical diffuser (which may be a screen placed onto the optical system or, preferably, forms an integral part of the optical system), the present invention thus permits the light, after passing through the optical diffuser, to be redistributed into a cone whose angular opening is wider than that corresponding to the total internal reflection limiting angle of the microstructures of the optical diffuser (within which it is desired to apply refraction of the light rays) according to the prior art. The angular opening can therefore reach a high value in a plane of propagation of the beam, for example 45°, depending on the amplitude of this pre-orientation.

It will be noted that the invention, by generating a particular shape of central light beam and/or of peripheral light beam in a plane comprising the optical axis, breaks the symmetry of revolution of the optical systems of the prior art described hereinabove, and thus allows the light intensity distribution of the composite beam generated to be deformed so that the desired angular opening may be attained in a plane comprising the optical axis.

It will furthermore be noted that the present invention can be implemented by a simple adaptation of the collimators of the prior art described hereinabove, with the result that the optical system implementing the method according to the invention is of simple design (in particular, made of a single monolithic piece) while at the same time being substantially compact.

Preferably, the optical system according to the invention is configured for generating, in the second plane, the central light beam and the peripheral light beam in such a manner that all of the light rays of the central light beam and of the peripheral light beam are respectively inclined, on either side of the optical axis, with respect to the optical axis.

When, in the second plane, the angular opening of the composite light beam must be at least equal to 45° after having been redistributed in the first plane by the optical diffuser, light rays of the central light beam and/or of the peripheral light beam can, prior to being redistributed in the first plane by the optical diffuser, on either side of the optical axis, be respectively inclined by an angle in the range between 5° and 15° with respect to the optical axis.

In this case, preferably, in the second plane, light rays of the central light beam and/or of the peripheral light beam are respectively, prior to being redistributed in the first plane by the optical diffuser, on either side of the optical axis, inclined by an angle in the range between 10° and 12° with respect to the optical axis.

According to one particular embodiment of the invention, in the second plane, the optical system has a peripheral portion comprising a first and a second portion of substantially parabolic surface:
respectively disposed on either side of the optical axis;
having a common focal point; and
respectively configured so that, when the light source is disposed at the common focal point, light rays emitted by the source are respectively, prior to being redistributed in the first plane by the optical diffuser, on either side of the optical axis, inclined with respect to the optical axis after reflection on the portions of substantially parabolic surface.

Thus, the peripheral light beam can be obtained, on either side of the optical axis, by portions of substantially parabolic surface analogous to those of the collimators according to the prior art described hereinabove, but re-oriented in such a manner that the respective axes of the substantially parabolic surfaces are inclined with respect to the optical axis while at the same time disposing these portions of substantially parabolic surface such that their focal points coincide. The light rays that are reflected on these portions thus respectively propagate along the axes of the portions and hence are inclined with respect to the optical axis.

It will be noted that, although the present invention can be implemented by generating a central and/or peripheral light beam that is convergent or divergent with respect to the common focal point, it is preferable to generate a divergent beam. For this purpose, the axes of the first and second portions of substantially parabolic surface are, downstream of the light source with respect to the direction of propagation of the light rays emitted by the light source, respectively situated on the side of the corresponding portion of parabolic surface.

According to one particular embodiment of the invention, the optical system is formed from a single monolithic piece whose cross section can comprise, in the second plane, on the side where the light source is designed to be disposed, a central portion joined to the peripheral portion via an intermediate portion whose cross section in the second plane is a segment of straight line, and the peripheral portion comprises the first and second portions of substantially parabolic surface.

In order to simplify the fabrication of the monolithic piece, the cross section of the intermediate portion runs along a straight line which cuts the optical axis downstream of the light source with respect to the direction of propagation of the light rays emitted by the light source. Thus, the central portion of the external profile of the optical system according to the invention can be formed by means of a mould which can readily be removed after fabrication.

In order to obtain a symmetrical illumination, the optical system according to the invention can be symmetrical with respect to a plane which comprises the optical axis and which is orthogonal to the second plane.

The invention also relates to an optical module comprising:
a single light source; and
an optical system according to one of the embodiments described hereinabove for generating, from the light source disposed on the optical axis of the optical system, the composite light beam.

In one advantageous embodiment of the invention, the optical module furthermore comprises an optical diffuser for redistributing the composite light beam in a predetermined manner in a plane orthogonal to the optical axis.

Preferably, the optical diffuser forms an integral part of the optical system.

Preferably, the optical diffuser also comprises a plurality of patterns whose shapes are determined in such a manner as to redistribute the composite light beam in a predetermined manner in the plane orthogonal to the optical axis.

The figures of the appended drawing will provide an understanding of how the invention can be implemented. In these figures, identical references denote similar elements.

These and other objects and advantages of the invention will be apparent from the following description, the accompanying drawings and the appended claims.

DETAILED DESCRIPTION OF THE PREFERRED EMBODIMENTS

In these figures, the optical systems are shown in a schematic fashion, without regard for the scales, including only the elements that have a significant optical role (as opposed to the assembly and mechanical adjustment elements).

Figure 1:
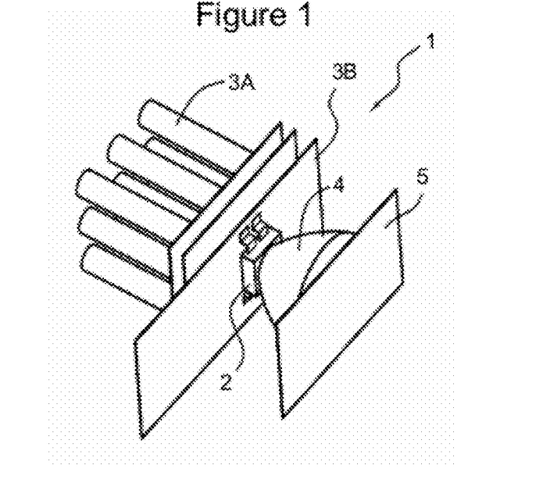
FIG. 1 is a perspective view of an optical module for a lighting and/or signalling device according to the prior art.

The optical module 1 according to the prior art, shown in FIG. 1, comprises a light source 2, for example a light-emitting diode (LED) which is a Lambertian emitter into a half-space, for example of red color for a stop light. This light source 2 is associated with a radiator 3A and mounted in a known manner onto a printed circuit 3B. The optical module 1 also comprises a collimator 4, configured with respect to the light source 2 in such a manner as to generate a composite light beam 6-7 comprising a central light beam 6 and a peripheral light beam 7 surrounding the central light beam 6 in a contiguous manner, the light rays of these two beams 6 and 7 being parallel to one another and also parallel to the optical axis X-X of the optical module 1. Lastly, the optical module 1 comprises an optical diffuser 5 disposed downstream of the collimator 4 (but it can also take the form of an addition of material to the collimator 4) in order to redistribute the light of the composite light beam 6-7 according to the corresponding regulations applicable to the illumination and/or signaling light.

Figure 2:
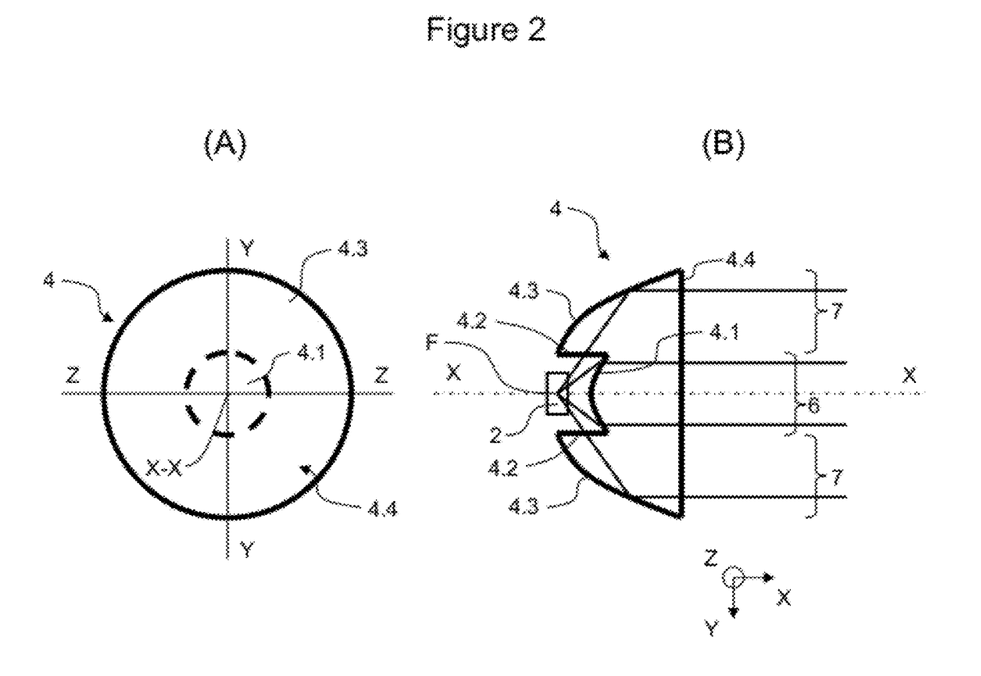
FIG. 2 shows diagrams A and B illustrating two cross-sectional views, respectively transverse and axial with respect to the optical axis, of the optical system integrated into the optical module in FIG. 1.

The collimator 4 is shown in more detail in FIG. 2. It is constructed from one monolithic piece, with a symmetry of revolution about the optical axis X-X (diagram A in FIG. 2), whose external profile 4.1 to 4.4 (diagram B in FIG. 2) has a shape capable of generating the central light beam 6 and the peripheral light beam 7.

More precisely, on the side of the light source 2, the external profile of the collimator 4 has a central portion 4.1 and a peripheral portion 4.3 joined together via an intermediate straight portion 4.2, substantially parallel to the optical axis X-X. On the opposite side to the light source 2, the external profile of the collimator 4 also has a downstream plane portion 4.4 that is perpendicular to the optical axis X-X.

Figure 3:
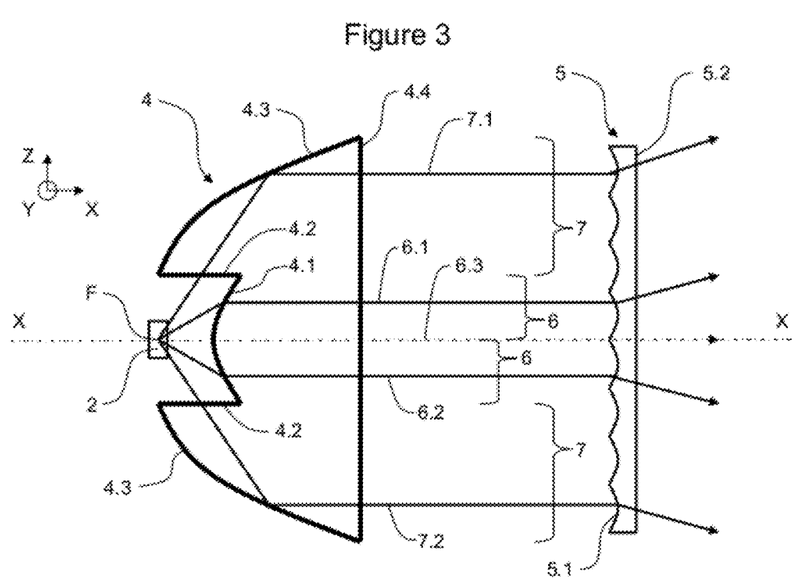
FIG. 3 is a cross-sectional axial view of the optical module in FIG. 1.

The central portion 4.1 forms, with the central part of the downstream portion 4.4, a convex lens whose focal point is situated at the light source 2 such that the central light beam 6 can be obtained (FIG. 3) by refraction of the light rays 6.1, 6.2 and 6.3 emitted by the light source 2 on the central portion 4.1 of the external profile of the collimator 4 then on the central part of the downstream portion 4.4, these light rays 6.1 to 6.3 then being parallel to the optical axis X-X.

The peripheral portion 4.3 has a substantially parabolic shape whose axis of symmetry is the optical axis X-X, and the focal point F is situated at the light source 2 such that the peripheral light beam 7 can be obtained (FIG. 3) by refraction of the light rays 7.1 and 7.2 emitted by the light source 2 on the intermediate portion 4.2, then by total internal reflection on the surface corresponding to the peripheral portion 4.3 and finally by refraction on the peripheral part of the downstream portion 4.4, these light rays 7.1 and 7.2 then also being parallel to the optical axis X-X (before passing through the optical diffuser 5). In addition, the peripheral light beam 7 surrounds the central light beam 6 in a contiguous fashion.

The composite light beam thus generated, which comprises the central light beam 6 and peripheral light beam 7, is designed to be directed towards the optical diffuser 5 (FIG. 3), which takes the form of a screen whose surface 5.2 facing the collimator 4 has a plurality of microstructures 5.1 and whose other surface is plane, in such a manner as to produce an illumination which, in a plane (Y-Y; Z-Z) orthogonal to the optical axis X-X of the optical module 1, exhibits certain features associated with the regulations in force for illumination and/or signaling lights for motor vehicles, notably as regards the uniformity and the angular opening.

Figure 4:
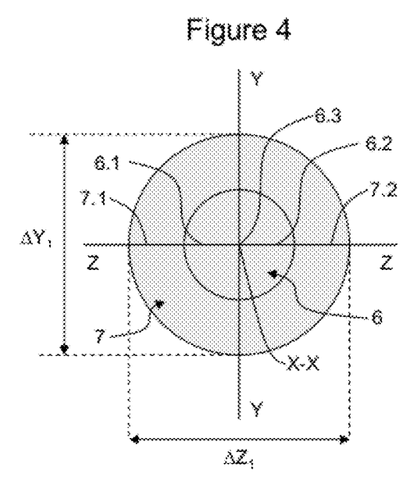
FIG. 4 is a diagram showing the projection of the composite light beam generated by the optical system in FIG. 2, before redistribution by the optical diffuser, in a plane orthogonal to the optical axis of the system.

The projection of the composite light beam thus generated in a first plane (Y-Y; Z-Z) orthogonal to the optical axis X-X, prior to passing through the optical diffuser 5, is shown in FIG. 4. This beam comes from the juxtaposition of the central light beam 6, in the center, and the peripheral light beam 7, around the central light beam 6. The dimensions of this projection of the composite beam, along the two mutually orthogonal axes Y-Y and Z-Z, are denoted by $\Delta Y_1$ and $\Delta Z_1$ in FIG. 4.

Figure 5:
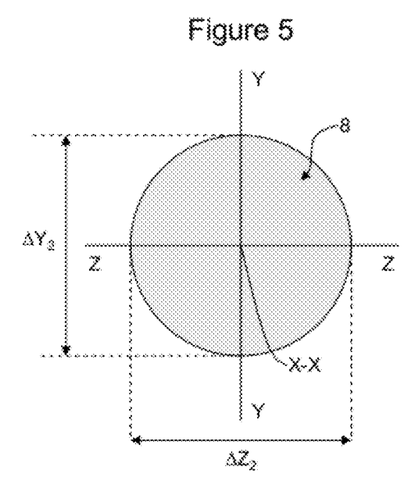
FIG. 5 is a diagram showing the projection of the composite light beam generated by the optical system in FIG. 2, after redistribution by the optical diffuser, in a plane orthogonal to the optical axis of the system.

As mentioned previously, the angular openings generated by the optical diffuser 5 are limited by the total internal reflection limiting angle within the patterns 5.1 of the optical diffuser 5. As is illustrated in FIG. 5, which shows the projection of the composite light beam in the first plane (Y-Y; Z-Z) orthogonal to the optical axis X-X after passing through the optical diffuser 5 and at a distance from the diffuser, this then results in a composite light beam whose angular openings along the two axes Y-Y and Z-Z (to which, in FIG. 5, the dimensions $\Delta Y_2$ and $\Delta Z_2$ of the projection of the beam in the plane (Y-Y; Z-Z) correspond) cannot reach 45° without resorting to locating the microstructures on the entry face of a diffuser, which then implies that the diffuser is separate from the collimator.

In order to improve the optical module 1 according to the prior art and allow the optical system and the optical diffuser to be formed from a single monolithic piece, the idea of the invention is to replace the collimator 4 by an optical system 14 capable of generating, no longer a light beam with rays parallel to the optical axis and with a symmetry of revolution about the optical axis X-X, but a beam whose characteristics differ according to the plane (comprising the optical axis X-X) in which the light rays are propagating.

Figure 6:
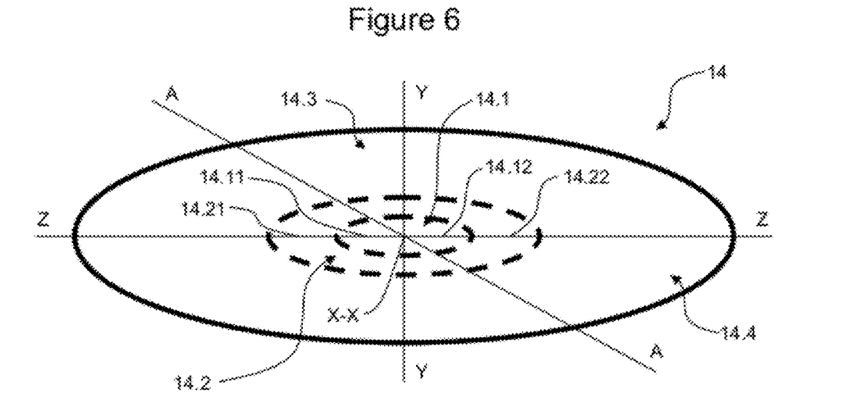
FIG. 6 is a transverse cross-sectional view of an optical system according to the present invention.

This optical system 14 is constructed from a monolithic piece with an oblong shape, whose large axis is disposed for example according to the axis Z-Z as is shown in FIG. 6, in contrast to the collimator 4 whose form is circular in the same plane (diagram A in FIG. 2). This optical system 14 is configured with respect to the light source 12 in such a manner as to generate a composite light beam 16-17 comprising a central light beam 16 and a peripheral light beam 17 surrounding the central light beam 16 in a contiguous fashion.

Since the angle of incidence of the light rays on the average plane containing the optical diffuser 15 is non-zero, the emerging light rays can be deviated by an angle greater than 45°, which permits the design of a reversing light with horizontal angular opening of around 45°.

Figure 8:
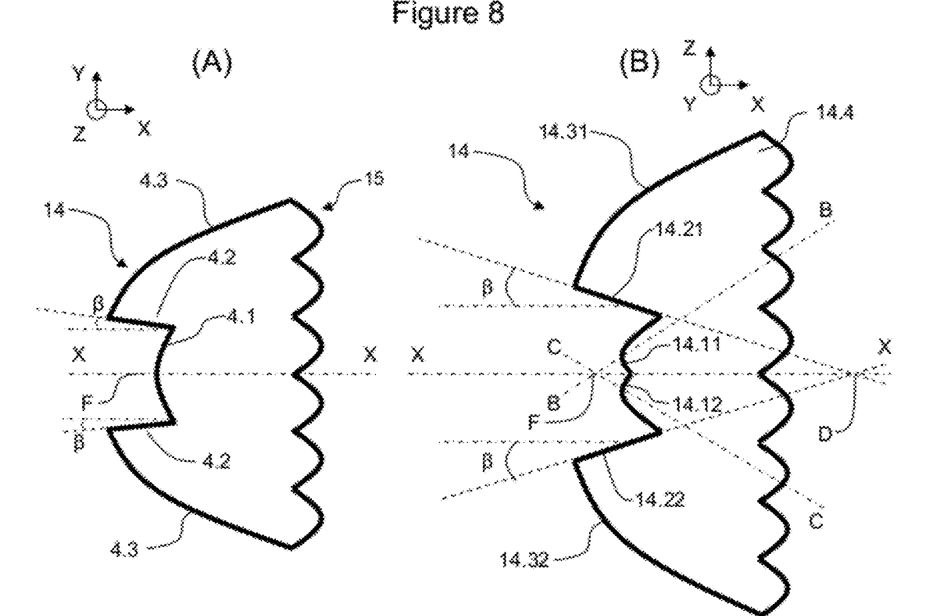
FIG. 8 shows diagrams A and B illustrating two axial cross-sectional views of the optical system integrated into the optical module in FIG. 6.
Figure 9:
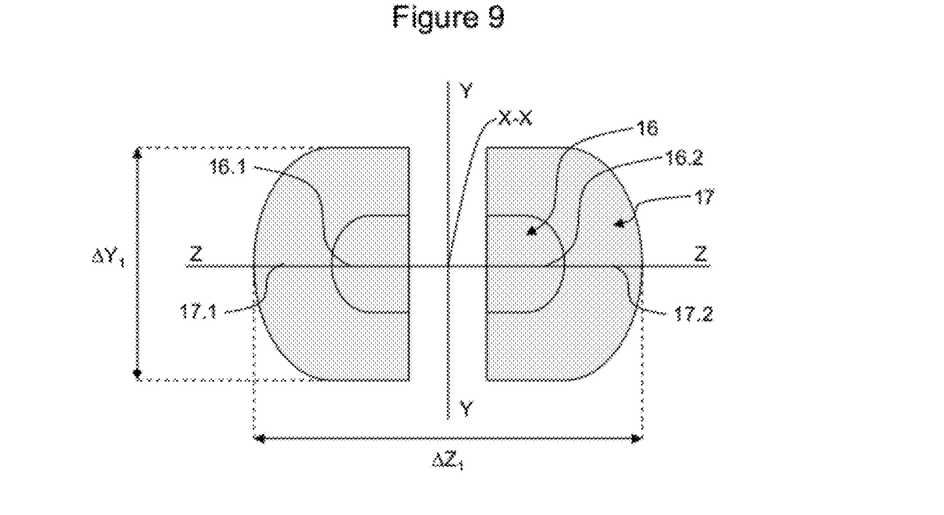
FIG. 9 is a diagram showing the projection of the composite light beam generated by the optical system in FIG. 6, before redistribution by the optical diffuser, in a plane orthogonal to the optical axis of the system.

For this purpose, the external profile of the monolithic piece forming the optical system 14 takes various forms depending on the cross-sectional plane of the latter. In particular, for a cross section in a plane (X-X; Y-Y), the external profile of the optical system 14, shown on the diagram A in FIG. 8, is substantially identical to that of the collimator 4 in FIGS. 2 and 3.

However, for a cross section in the second plane (X-X; Z-Z), orthogonal to the aforementioned plane (X-X; Y-Y), the external profile of the optical system 14, shown on the diagram B in FIG. 8, has a shape adapted to the formation of a beam with wide angular opening. On the side of the light source 12, the external profile of the optical system 14 has a peripheral portion 14.3 formed of two portions 14.31 and 14.32 of substantially parabolic shape, with an inclination greater than the peripheral portion 4.3 of the collimator 4 in FIGS. 2 and 3 in the cross-sectional plane (X-X; Y-Y).

The external profile of the optical system 14 also has a central portion 14.1 formed of two portions 14.11 and 14.12 configured for deviating the light rays 16.1 and 16.2 with respect to the optical axis X-X, according to respective angles $\alpha 16.1$ and $\alpha 16.2$.

The peripheral portion 14.3 and the central part 14.1 are joined together by an intermediate portion 14.2 composed of two straight line portions 14.21 and 14.22 and forming positive angles $\beta$ with the optical axis X-X, such that the portions 14.21 and 14.22 run along a straight line which intersects the optical axis at a point D situated downstream of the light source (with respect to the direction of propagation of the light rays emitted by the source). Thus, by these angles $\beta$ (which can be positive or else zero), the central portion 14.1 of the optical system 14 can be formed by means of a molding tool which can be readily removed.

More precisely, with reference to the diagram B in FIG. 8, in the second aforementioned plane (X-X; Z-Z), the peripheral portion 14.3 is formed from a first portion of substantially parabolic surface 14.31, on one side of the optical axis X-X, together with the second portion of substantially parabolic surface 14.32, on the other side of the optical axis X-X. The focal points of these two portions of substantially parabolic surface coincide, such that the portions of substantially parabolic surface 14.31 and 14.32 have a common focal point F.

In addition, according to the invention, these two portions 14.31 and 14.32, which are respectively disposed on either side of the optical axis X-X, are respectively configured so that, when the light source 12 is disposed at the common focal point F of the portions, rays such as the light rays 17.1 and 17.2 emitted by the light source 12 are respectively inclined with respect to the optical axis X-X, according to angles $\alpha 17.1$ and $\alpha 17.2$, after reflection on the portions of parabolic surfaces 14.31 and 14.32, respectively.

In order for the peripheral light beam 17 to be a diverging beam (with respect to the direction of propagation of the beam), the axes B-B and C-C (diagram B in FIG. 8), respectively of the first portion 14.31 and of the second portion 14.32 of substantially parabolic surface, are respectively situated, downstream of the light source 12 (with respect to the direction of propagation of the beam), on the side of the portion of corresponding parabolic surface. Here, the axis of a portion of substantially parabolic surface is understood to mean the axis of symmetry of the corresponding parabolic surface if the latter were completely there and not simply a portion of the latter.

Figure 7:
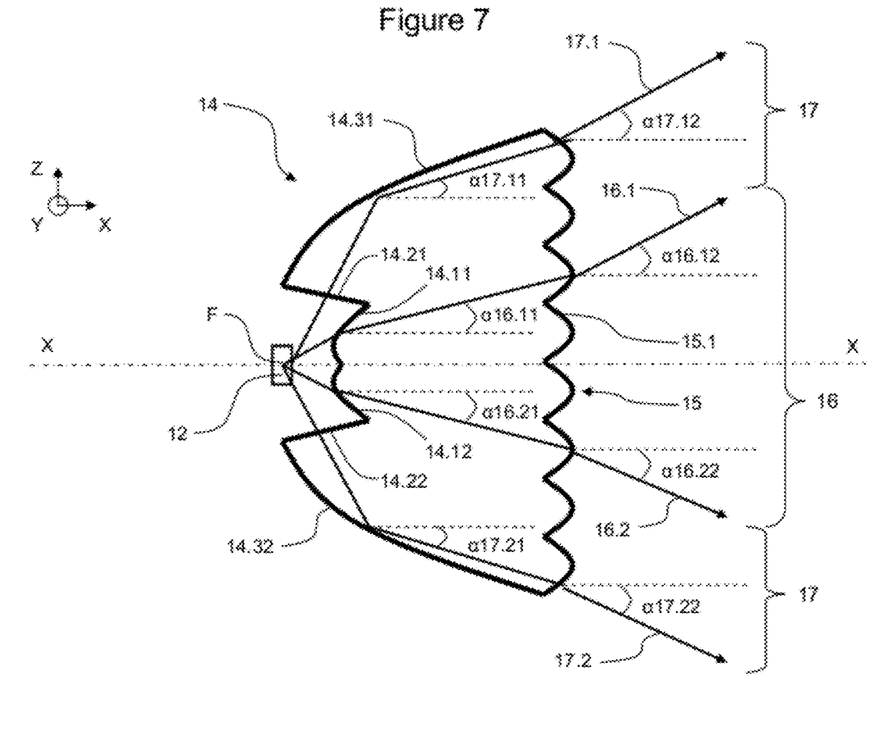
FIG. 7 is an axial cross-sectional view of the optical module according to the present invention, equipped with the optical system in FIG. 6.

Thus, in the cross-sectional plane (X-X, Z-Z), the rays 17.1 and 17.2 of the peripheral light beam 17 can be directed in a suitable manner (FIG. 7) by refraction on the portions 14.21 and 14.22, respectively, then by total internal reflection on the portions of substantially parabolic surfaces 14.31 and 14.32, respectively (which form part of the peripheral portion 14.3), these light rays 17.1 and 17.2 then being respectively inclined, on either side of the optical axis X-X, with respect to the optical axis X-X according to angles $\alpha 17.11$ (positive) and $\alpha 17.21$ (negative).

The central light beam 16, for its part, can be obtained (FIG. 7) by refraction of the light rays 16.1 and 16.2 respectively emitted by the light source 12 on the portions 14.11 and 14.12, these light rays 16.1 and 16.2 then being divergent and inclined with respect to the optical axis X-X according to angles $\alpha 16.11$ (positive) and $\alpha 16.21$ (negative).

On the opposite side to the light source 12, the external profile of the system 14 has a set of patterns 15.1 forming the optical diffuser 15.

Between the two aforementioned cross-sectional planes (X-X; Y-Y) and (X-X; Z-Z), for example in the cross-sectional plane (X-X; A-A, FIG. 6), the form of the external profile of the optical system 14 develops for example in a continuous and progressive manner, from the form in the plane (X-X; Y-Y) (diagram A in FIG. 8) to the form in the plane (X-X; Z-Z) (diagram B in FIG. 8), the monolithic piece forming the optical system 14 not then having any discontinuity.

After passing through the optical diffuser 15 (FIG. 7), the illumination thus generated can exhibit a distribution according to the regulations in force and a horizontal angular opening of around 45°, the light rays 16.1, 16.2, 17.1 and 17.2 then being inclined with respect to the optical axis X-X according to angles $\alpha 16.12$, $\alpha 16.22$, $\alpha 17.12$ and $\alpha 17.22$, respectively, greater than the angles $\alpha 16.11$, $\alpha 16.21$, $\alpha 17.11$ and $\alpha 17.21$, respectively, of the light rays prior to passing through the optical diffuser 15.

Figure 10A:
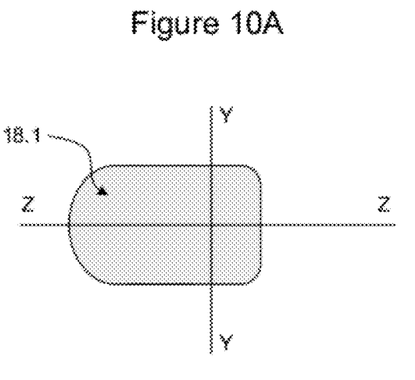
FIGS. 10A and 10B are diagrams showing the projections of the contributions on the two opposing sides of the optical system in FIG. 6 to the composite light beam, after redistribution by the optical diffuser, in a plane orthogonal to the optical axis of the system.
Figure 10B:
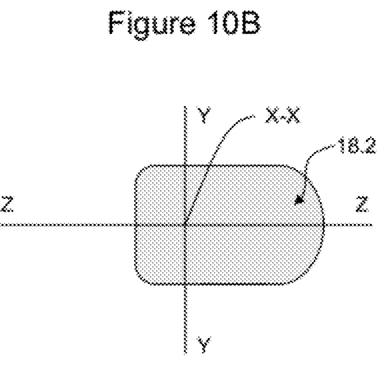

In this case, the composite light beam (after passing through the optical diffuser 15) results from the superposition of the two contributions shown in FIGS. 10A and 10B:
- a first contribution 18.1 (FIG. 10A) corresponding to the part of the composite light beam 16-17 oriented with respect to the optical axis X-X according to a positive angle (here comprising the light rays 16.1 and 17.1); and
- a second contribution 18.2 (FIG. 10B) corresponding to the part of the composite light beam 16-17 oriented with respect to the optical axis X-X according to a positive angle (here comprising the light rays 16.2 and 17.2).

Figure 11:
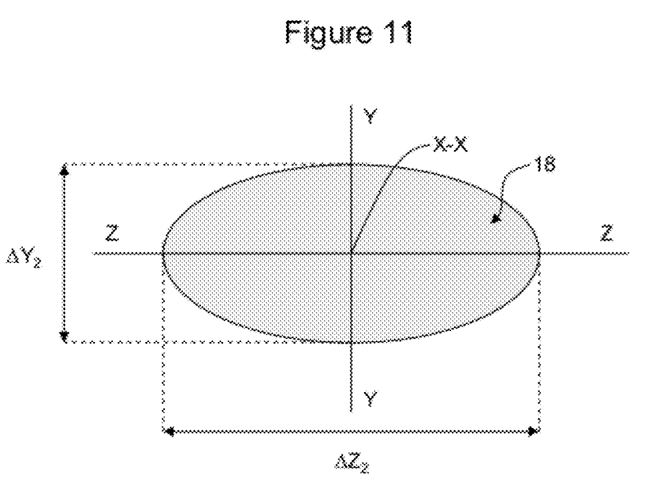
FIG. 11 is a diagram showing the projection of the composite light beam generated by the optical system in FIG. 6, after redistribution by the optical diffuser, in a plane orthogonal to the optical axis of the system.

The resulting composite light beam 18, coming from the juxtaposition of these two contributions 18.1 and 18.2, is shown in FIG. 11. The angular openings of the beam, to which the dimensions $\Delta Y_2$ and $\Delta Z_2$ correspond, can then reach values greater than those allowed to be obtained by the prior art embodiments with a single monolithic piece forming the optical system and the optical diffuser.

The determination of the shape and dimensions of the patterns 15.1 (which can be different from one another), based on the regulations in force for a given light, forms part of the current practices within the capabilities of those skilled in the art.

In order to obtain a horizontal angular opening of 45°, it has been observed that an inclination of the light rays of the central light beam 16 and/or of the peripheral light beam 17 of the order of 5 to 15° in the horizontal plane (X-X; Z-Z), preferably in the range between 10 and 12°, was adequate.

It will be noted that the invention described hereinabove, with reference to FIGS. 6 to 11, represents the case of a diverging peripheral light beam 17, but the invention may also be implemented with a converging peripheral light beam. For this purpose, the shape of the peripheral portion 14.3 of the external profile of the optical system 14 is adapted for generating light rays 17.1 and 17.2 inclined with respect to the optical axis by angles $\alpha 17.11$ (negative) and $\alpha 17.21$ (positive). In this case, the axes B-B and C-C of the first portion 14.31 and of the second portion 14.32 of parabolic surface are, downstream of the light source 12 (with respect to the direction of propagation of the light rays 17.1 and 17.2 emitted by the light source 12), situated respectively on the opposite side with respect to the corresponding portion of parabolic surface 14.31 or 14.32. Accordingly, in order to obtain a redistribution of the light up to 45° as is the case with a divergent beam, the main adjustments are the distance between the portions 14.11, 14.12, 14.31, 14.32 and the optical diffuser 15, so that the peripheral light beam 17 reaches the optical diffuser 15 while being no longer convergent but now divergent. It will however be noted that this imposes that the optical diffuser 15 be moved far enough away to make the beam divergent and that, for this reason, the embodiment in FIGS. 6 to 11 is preferred.

In any case, what is important, according to the invention, is for each pattern 15.1 of the optical diffuser 15 to receive a single inclination of light ray.

By convention, the planes and angles described hereinabove are oriented in the trigonometric sense.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An optical system for generating, from a light source and along an optical axis (X-X), a composite lighting or signaling beam for a motor vehicle, said composite lighting or signaling beam comprising at least one central light beam and at least one peripheral light beam surrounding said at least one central light beam; and
   said optical system comprising an optical diffuser for distributing for distributing said composite light beam in a predetermined manner in a first plane (Y-Y, Z-Z) orthogonal to said optical axis (X-X);
   wherein said optical diffuser of the optical system is configured for generating, in a second plane (X-X; Z-Z) comprising said optical axis (X-X), said at least one central light beam and/or said at least one peripheral light beam surrounding said at least one central light beam in such a manner that light rays of said at least one central light beam and/or of said at least one peripheral light beam are inclined to provide an angular opening of at least 45°, on either side of said optical axis (X-X), with respect to said optical axis (X-X).

2. The optical system according to claim 1, configured for generating, in said second plane (X-X; Z-Z), said at least one central light beam and said at least one peripheral light beam in such a manner that all of said light rays of said at least one central light beam and of said at least one peripheral light beam are respectively inclined, on either side of said optical axis (X-X), with respect to said optical axis (X-X).

3. The optical system according to claim 2, wherein said optical diffuser provides said light rays of said at least one central light beam and/or of said at least one peripheral light beam are respectively, prior to being redistributed in said first plane (Y-Y, Z-Z) by said optical diffuser, on either side of said optical axis (X-X), inclined by an angle in the range between 5° and 15° with respect to said optical axis (X-X).

4. The optical system according to claim 2, wherein said optical diffuser has in said second plane (X-X; Z-Z), a peripheral portion comprising a first portion of substantially parabolic surface and a second portion of substantially parabolic surface:
   respectively disposed on either side of said optical axis (X-X);
   exhibiting a common focal point (F); and
   respectively configured so that, when said light source is disposed at said common focal point (F), said light rays emitted by said light source are respectively, prior to being redistributed in said first plane (Y-Y, Z-Z) by said optical diffuser, on either side of said optical axis (X-X), inclined with respect to said optical axis (X-X) after reflection on said first and said second portions of substantially parabolic surface.

5. The optical system according to claim 1, wherein said optical diffuser provides said light rays of said at least one central light beam and/or of said at least one peripheral light beam are, respectively, prior to being redistributed in said first plane (Y-Y, Z-Z) by said optical diffuser, on either side of said optical axis (X-X), inclined by an angle in the range between 5° and 15° with respect to said optical axis (X-X).

6. The optical system according to claim 5, in which, in said second plane (X-X; Z-Z), said light rays of said at least one central light beam and/or of said at least one peripheral light beam are respectively, prior to being redistributed in said first plane (Y-Y, Z-Z) by said optical diffuser, on either side of said optical axis (X-X), inclined by an angle in the range between 10° and 12° with respect to said optical axis (X-X).

7. The optical system according to claim 6, wherein said optical diffuser has in said second plane (X-X; Z-Z), a peripheral portion comprising a first portion of substantially parabolic surface and a second portion of substantially parabolic surface:
respectively disposed on either side of said optical axis (X-X);
exhibiting a common focal point (F); and
respectively configured so that, when said light source is disposed at said common focal point (F), said light rays emitted by said light source are respectively, prior to being redistributed in said first plane (Y-Y, Z-Z) by said optical diffuser, on either side of said optical axis (X-X), inclined with respect to said optical axis (X-X) after reflection on said first and said second portions of substantially parabolic surface.

8. The optical system according to claim 5, wherein said optical diffuser has in said second plane (X-X; Z-Z), a peripheral portion comprising a first portion of substantially parabolic surface and a second portion of substantially parabolic surface:
respectively disposed on either side of said optical axis (X-X);
exhibiting a common focal point (F); and
respectively configured so that, when said light source is disposed at said common focal point (F), said light rays emitted by said light source are respectively, prior to being redistributed in said first plane (Y-Y, Z-Z) by said optical diffuser, on either side of said optical axis (X-X), inclined with respect to said optical axis (X-X) after reflection on said first and said second portions of substantially parabolic surface.

9. The optical system according to claim 1, wherein said optical diffuser has in said second plane (X-X; Z-Z), a peripheral portion comprising a first portion of substantially parabolic surface and a second portion of substantially parabolic surface:
respectively disposed on either side of said optical axis (X-X);
exhibiting a common focal point (F); and
respectively configured so that, when said light source is disposed at said common focal point (F), said light rays emitted by said light source are respectively, prior to being redistributed in said first plane (Y-Y, Z-Z) by said optical diffuser, on either side of said optical axis (X-X), inclined with respect to said optical axis (X-X) after reflection on said first and said second portions of substantially parabolic surface.

10. The optical system according to claim 9, in which the axes (B-B, C-C) of said first and said second portions of substantially parabolic surface are, downstream of said light source with respect to the direction of propagation of said light rays emitted by said light source, respectively situated on the side of the corresponding portion of said first and second portions of substantially parabolic surface.

11. The optical system according to claim 10, formed from a single monolithic piece whose cross section comprises, in said second plane (X-X; Z-Z), on the side where said light source is designed to be disposed, a central portion joined to an peripheral portion via an intermediate portion whose cross section in said second plane is a straight-line segment, said peripheral portion comprising said first and said second portions of substantially parabolic surface.

12. The optical system according to claim 9, formed from a single monolithic piece whose cross section comprises, in said second plane (X-X; Z-Z), on the side where said light source is designed to be disposed, a central portion joined to an peripheral portion via an intermediate portion whose cross section in said second plane is a straight-line segment, said peripheral portion comprising said first and said second portions of substantially parabolic surface.

13. The optical system according to claim 12, in which said cross section of said intermediate portion runs along a straight line which intersects said optical axis downstream of said light source with respect to the direction of propagation of said light rays emitted by said light source.

14. An optical module comprising:
a single light source; and
an optical system according to claim 1 for generating, from said light source disposed on said optical axis (X-X) of said optical system, said composite light beam.

15. The optical module according to claim 14, furthermore comprising an optical diffuser for redistributing said composite light beam in a predetermined manner in a plane (Y-Y, Z-Z) orthogonal to said optical axis (X-X).

16. The optical module according to claim 15, in which said optical diffuser forms an integral part of said optical system.

17. An optical system comprising:
a collimator having a peripheral portion having a parabolic shape;
a central portion that is centrally located in said optical system and that forms a convex lens whose focal point is generally situated at a light source for emitting a light beam;
an intermediate portion that integrally joins said peripheral portion and said central portion, said intermediate portion lying in a plane that intersects an optical axis of said optical system at a point downstream of said light source;
wherein said collimator, said central portion and said intermediate portion are configured for generating, in a second plane (X-X; Z-Z) comprising said optical axis (X-X), said at least one central light beam and/or said at least one peripheral light beam surrounding said at least one central light beam in such a manner that light rays of said at least one central light beam and/or of said at least one peripheral light beam have an angular opening of at least 45°, on either side of said optical axis (X-X), with respect to said optical axis (X-X).

18. The optical system according to claim 17, wherein said optical system further comprises:
a diffuser integrally formed with said peripheral portion.

19. The optical system according to claim 18, wherein said central portion comprises a plurality of convex lenses having a plurality of focal points.

20. The optical system according to claim 17, wherein said central portion comprises a plurality of convex lenses having a plurality of focal points.

* * * * *

UNITED STATES PATENT AND TRADEMARK OFFICE
CERTIFICATE OF CORRECTION

| | | Page 1 of 1 |
|---|---|---|
| PATENT NO. | : 8,845,142 B2 | |
| APPLICATION NO. | : 13/437181 | |
| DATED | : September 30, 2014 | |
| INVENTOR(S) | : Lamberterie | |

It is certified that error appears in the above-identified patent and that said Letters Patent is hereby corrected as shown below:

In the claims

Column 10, claim 1, lines 26-27, delete the second occurrence of "for distributing."

Signed and Sealed this
Twenty-fourth Day of November, 2015

Michelle K. Lee
*Director of the United States Patent and Trademark Office*